US012158980B2

(12) United States Patent
Aigner et al.

(10) Patent No.: US 12,158,980 B2
(45) Date of Patent: Dec. 3, 2024

(54) DISTRIBUTED TRUSTED PLATFORM MODULE KEY MANAGEMENT PROTECTION FOR ROAMING DATA

(71) Applicant: Microsoft Technology Licensing, LLC, Redmond, WA (US)

(72) Inventors: Ronald Aigner, Redmond, WA (US); Giridhar Viswanathan, Redmond, WA (US); Lars Reuther, Kirkland, WA (US); Alvin Morales Caro, Redmond, WA (US); David Kimler Altobelli, Redmond, WA (US); Dan Ma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 543 days.

(21) Appl. No.: 17/459,445

(22) Filed: Aug. 27, 2021

(65) Prior Publication Data

US 2023/0066427 A1    Mar. 2, 2023

(51) Int. Cl.
*G06F 21/78* (2013.01)
*H04L 9/08* (2006.01)
*H04L 9/32* (2006.01)

(52) U.S. Cl.
CPC ............ *G06F 21/78* (2013.01); *H04L 9/0827* (2013.01); *H04L 9/3263* (2013.01)

(58) Field of Classification Search
CPC ............ G06F 21/78; G06F 2009/4557; G06F 2009/45587; G06F 9/45558; G06F 21/53; G06F 21/57; H04L 9/0827; H04L 9/3263
USPC .......................................................... 713/193
See application file for complete search history.

(56) References Cited

U.S. PATENT DOCUMENTS

| 2006/0256106 | A1 | 11/2006 | Scarlata et al. |
| 2007/0094719 | A1* | 4/2007 | Scarlata ............... G06F 21/577 726/9 |
| 2008/0244569 | A1 | 10/2008 | Challener et al. |
| 2009/0169012 | A1* | 7/2009 | Smith ................... H04L 9/0836 380/277 |
| 2011/0283352 | A1 | 11/2011 | Berger et al. |

(Continued)

OTHER PUBLICATIONS

"International Search Report and Written Opinion Issued in PCT Application No. PCT/US22/036155", Mailed Date: Sep. 21, 2022, 13 Pages.

*Primary Examiner* — Bryan F Wright

(57) ABSTRACT

Distributed security key management for protecting roaming data via a trusted platform module is performed by systems that include first and second processors, and first and second respective hardware security modules. The first security module encrypts a security key using a public key from the second security module, and the encrypted security key is provided to the second security module. A virtual machine (VM) executed by the first processor has a first virtual security module instance having state data that includes a storage key encrypting VM virtual disk data and that is encrypted with the security key. When a transfer condition is determined, the VM is transferred and executed by the second processor, using a second virtual security module instance, based on decrypting the security key by the second security module using a private key and decrypting the state data for the second virtual security module using the security key.

20 Claims, 5 Drawing Sheets

(56) References Cited

U.S. PATENT DOCUMENTS

2014/0101450 A1* 4/2014 Scarlata .............. G06F 21/57
                                                   713/171
2017/0005990 A1   1/2017 Birger et al.
2023/0344646 A1* 10/2023 Mackenbach ........... G09C 1/00

* cited by examiner

DISTRIBUTED TRUSTED PLATFORM MODULE KEY MANAGEMENT PROTECTION FOR ROAMING DATA

BACKGROUND

Virtual machines (VMs) that execute on computing device hardware may include sensitive or confidential information and data associated with the state of the VMs and/or their virtual disks. Such information is more vulnerable when at rest and stored during times that the VMs are not executing. In the context of computing clusters, when VMs transfer between servers of the cluster, this roaming of the information and data further exposes these vulnerabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed security key management for protecting roaming data via a trusted platform module (TPM) is performed by systems that include first processing circuitry, a first hardware security module associated with the first processing circuitry, second processing circuitry, and a second hardware security module associated with the second processing circuitry. A cryptographic security key is encrypted by the first security module using a public key from the second security module, and the encrypted cryptographic security key is provided to the second security module. A virtual machine (VM) executed by the first processor has a first virtual security module instance having VM state data that includes a storage key encrypting VM virtual disk data, where the VM state data is encrypted with the cryptographic security key. When a transfer condition is determined, for a fail-over or for a migration, the VM is transferred and executed by the second processor, using a second virtual security module instance, based on decrypting the encrypted cryptographic security key by the second security module using a private key and decrypting the state data using the cryptographic security key.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
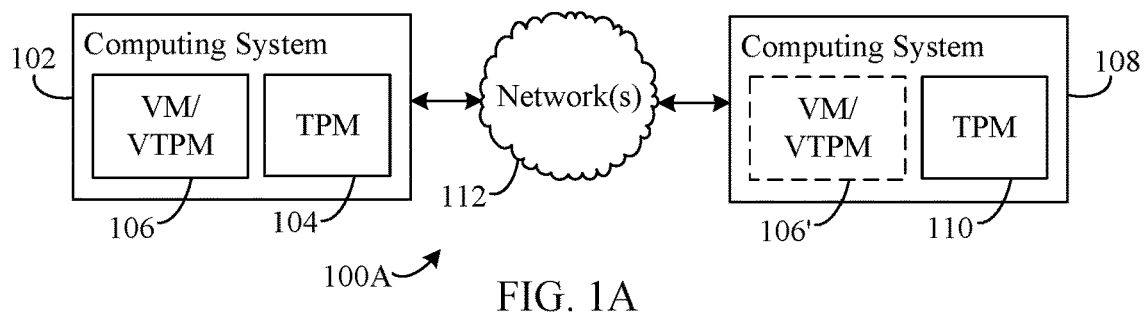
FIG. 1A shows a block diagram of a system for distributed security key management for protecting roaming data via a trusted platform module (TPM), according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for protection of security keys for roaming data via a trusted platform module (TPM). Section III below describes example computing device embodiments that may be used to implement features of the embodiments described herein. Section IV below describes additional examples and advantages, and Section V provides some concluding remarks.

II. Example Embodiments for Protection of Security Keys for Roaming Data Via a TPM Methods for distributed security key management in protecting roaming data via a trusted platform module (TPM) are performed by systems and devices. Embodiments herein may be directed to client/user systems, server systems, server clusters, and/or the like though which data and information of virtual machines (VMs), executed according to embodiments, is protected for at rest and roaming states by security key management associated with TPMs, or other equivalent hardware security modules, generally.

VMs provide a software-based virtualization of a computing device or system with dedicated amounts of processing, memory, and storage resources that are "borrowed" from a physical host system, e.g., a server or the like. VMs may be stored as computer files or images that behave like a physical computing system when executed. VMs may be executed in a separate and/or protected computing environment of a host such as a different operating system than the main host operating system. That is, VMs may be partitioned separately from the rest of the host system, meaning that the software inside a VM cannot interfere with the host system's primary operating system. VMs may execute different types of software applications (also "software" or "apps"), including services, for end users of the host system. Host systems may include, without limitation, any type of computing system such as a personal computer or laptop running Windows® or a server cluster in a cloud-based implementation like Azure® (both from Microsoft Corporation of Redmond, Wash.). Additionally, a VM may utilize a software application such as BitLocker® from Microsoft Corporation of Redmond, Wash., to generate security storage keys to encrypt and protect data and information in the virtual disks of the VMs.

As described herein, embodiments may utilize a TPM (or a hardware security module (HSM), any type of secure hardware and/or software-based cryptoprocessor, and/or another equivalent hardware security mechanism/module) in computing devices/systems to generate and distribute security keys that protect data at rest and roaming data associated with the VMs during their transfer to a different host system and/or when otherwise not being executed. Embodiments provide for instances of virtual TPMs (or equivalent virtual hardware security instances) that are respectively executed in conjunction with VMs. In other words, the virtual TPMs are configured to operate as would physical TPMs for associated VMs, and embodiments also enable multiple virtual TPMs based on a single physical TPM in a computing system (e.g., a TPM in a server of a server cluster) where each virtual TPM may have a unique instance identifier. In some embodiments, each virtual TPM instance is governed by a centralized virtual TPM manger (which may be implemented on any server or device in a system thereof) to ensure that each instance is unique. Virtual TPMs have associated states that include, without limitation, data describing the current execution of the virtual TPM and security storage keys used to encrypt and protect data and information in virtual disks of the VMs, and accordingly, this state data also needs protection for at rest and roaming scenarios at least because the security storage keys are included therein.

As a non-limiting example, in a server cluster, VMs may migrate between servers of the server cluster and/or may be otherwise transferred therebetween for server fail-over conditions. The VMs protect their respective virtual disks when at rest and/or roaming, e.g., using encryption such as via Bitlocker® or the like. The cryptographic key used for storage encryption (a "security storage key") may be protected by a virtual TPM associated with a given VM. The state of the virtual TPM that contains the security storage key requires protection as well. The cryptographic security key (e.g., "KeyA" in this scenario) to protect the state of the virtual TPM may be stored in the physical TPM of the server that runs/executes the VM.

When the VM is to be transferred (e.g., via migration, based on a fail-over condition of the server, etc.) to another server, the state of the virtual TPM needs to transfer along with the VM, and this also implies that the cryptographic security key (KeyA) stored in the physical TPM needs to transfer along with the VM. The TPM is configured to create cryptographic security keys that can be duplicated into another TPM at a different server, and accordingly, embodiments herein enable the duplication of KeyA between TPMs of different servers in the server cluster.

In furtherance of this aspect in the context of the present example, the target TPM of the server to which the transfer is performed communicates a public portion of a cryptographic transfer key (e.g., "SRK-pubB" in this scenario) to the source TPM at the server from which the transfer is performed. The source TPM then encrypts KeyA with SRK-pub B. The encrypted KeyA is then transferred to the target server where only the target TPM that has the private portion of the transfer key (e.g., "SRK-privB" in this scenario) can decrypt KeyA. Thus, the target TPM is enabled load KeyA subsequent to its decryption, and then KeyA may be used on the target server to decrypt the virtual TPM state that was/is transferred.

Additionally, and to enable free movement between the servers in the server cluster, a distributed communication algorithm may be used to announce the creation of a new cryptographic security key (e.g., KeyA) to the server cluster. All servers from the server cluster may provide their respective public portion of cryptographic transfer keys (SRK-pub's) to the server at which the new cryptographic security is generated. The server that created KeyA may then encrypt KeyA to all SRK-pub's received and provide the encrypted keys back to each server that provided its public transfer key portion. Each server that provided its SRK-pub can then import KeyA into their respective TPM and thus become a potential target server to which the virtual TPM state may be transferred. In cases when a new server joins or is added to the cluster, the new server may announce its presence and receive encrypted KeyAs from all servers that have a KeyA present in their respective TPMs.

Moreover, instead of creating new cryptographic security keys for each VM, embodiments provide for these TPM-based keys to be created and distributed only once, in embodiments. Therefore, a TPM-based key may be used in software to derive other encryption keys to protect the virtual TPM state, as described herein, and as a single key of a given TPM is utilized, operational complexity is reduced as is the TPM memory footprint. Also, to ensure that only physical TPMs of approved servers in a server cluster can receive an encrypted KeyA, servers are enabled share registered certificates for their respective SRK-pub transfer key portions. In this way, a server distributing KeyA may validate the provided certificate to ensure it belongs to a TPM it trusts in order for that TPM to receive KeyA. The certificates may include respective SRK-pub transfer key portions, which can be used for the subsequent operations of the embodiments herein.

Protecting the state of a virtual TPM is a specific instance of roaming/at-rest data that can be protected with this schema, but embodiments herein are not so limited as would be understood by persons of skill in the relevant art(s). Additionally, embodiments herein may be described with respect to servers in server clusters, but such descriptions are illustrative in nature and are not to be considered limiting. Embodiments herein also combine migration and fail-over technology in VM clusters with physical TPMs of the host servers to protect states of VMs that transfer between servers of the cluster. By storing the security key used to encrypt and protect data inside a physical TPM, extraction of private keys used herein becomes unpractical and provides a secure mechanism for sensitive data, roaming and at-rest.

Accordingly, the embodiments herein provide for solutions to issues associated with roaming data and data at rest, e.g., in the context of transferred VMs, by providing secure methods and systems security key management via TPMs. These and other embodiments for protecting roaming data and data at rest via TPM key management will be described in further detail below in association with the Figures, and in the Sections/Subsections that follow.

Systems, devices, and apparatuses may be configured in various ways for distributed security key management for protecting roaming data via a TPM. For instance, FIG. 1A is a block diagram of a system 100A, according to embodiments. System 100A is configured for distributed security key management for protecting roaming data via a TPM, according to embodiments. As shown in FIG. 1A, system 100A includes a computing system 102 and a computing system 108. In embodiments, computing system 102 and computing system 108 are enabled to communicate with each other over a network 112. It should be noted that various numbers of computing systems may be present in various embodiments. Additionally, any combination of the components illustrated in FIG. 1A may be present in system 100A, according to embodiments.

Network 112 may comprise any number and/or type of communication links that connect computing devices and hosts/servers such as, but not limited to, the Internet, wired or wireless networks and portions thereof, point-to-point connections, local area networks, enterprise networks, and/or the like.

Computing system 102 and computing system 108 may each comprise one or more server computers or computing devices, which may include one or more distributed or "cloud-based" servers, including being ones of a server cluster. In embodiments, Computing system 102 and computing system 108 each may be associated with, or may be a part of, a cloud-based service platform such as Microsoft® Azure® from Microsoft Corporation of Redmond, Wash., and in some embodiments, computing system 102 and computing system 108 may comprise on-premises servers in addition to, or in lieu of, cloud-based servers. Various systems/devices herein, such as computing system 102 and computing system 108 may be configured to execute VMs, utilizing processing circuitry and memory thereof, and respectively associated virtual TPMs (VTPMs) based on a physical TPM thereof.

As illustrated, computing system 102 includes a VM/VTPM 106 executed thereby and a TPM 104, while computing system 108 includes a TPM 110. The VTPM of VM/VTPM 106 that executes in conjunction with the VM of VM/VTPM 106 includes state data as described herein. TPM 104 is configured to generate cryptographic security keys utilized in encrypting and protecting data and information associated with the VM of VM/VTPM 106, such as the state data. When a transfer condition for the VM of VM/VTPM 106 is determined or detected, the VM is transferred, along with state data, via network 112 for execution at computing system 108 as VM/VTPM 106'. The of VM VM/VTPM 106' is executed at computing system 108 based on the state data, that is decrypted by TPM 110, for use by the VTPM of VM/VTPM 106', which is a virtual instance of TPM 110.

It should be noted that as described herein, computing system 102 and/or computing system 108 may be applicable to any type of system for performance of operations for embodiments. One example of implementations noted above are network, or "cloud," implementations, applications, or services in a network architecture/platform. A cloud platform may include a networked set of computing resources, including servers, routers, etc., that are configurable, shareable, provide data security, and are accessible over a network such as the Internet. Cloud applications/services may run on these computing resources, often atop operating systems that run on the resources, for entities that access the applications/services, locally and/or over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run the VMs described herein (emulated computer systems, including operating systems) for tenants. A hypervisor may present a virtual operating platform for tenants, according to embodiments. Hypervisors herein may use a virtualized security mode (VSM) in which generated encryption keys are tied to a trusted computing base (TCB) of the system.

Figure 1B:
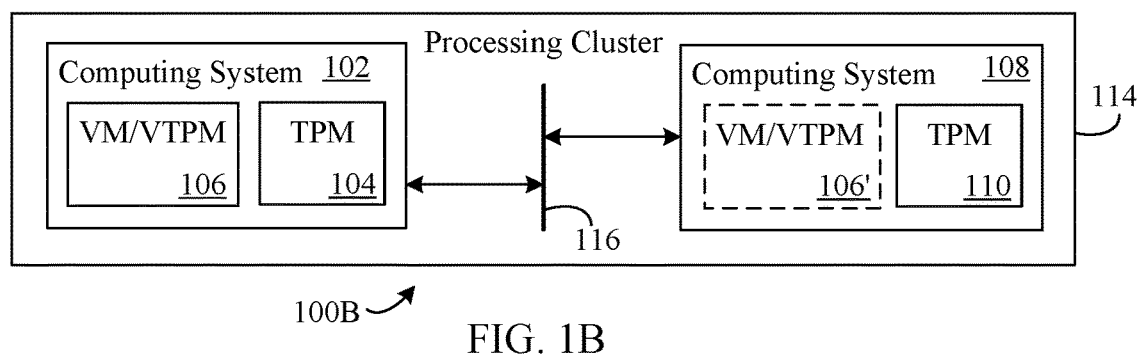
FIG. 1B shows a block diagram of a system for distributed security key management for protecting roaming data via a TPM, according to an example embodiment.

Computing system 102 and computing system 108 may be implemented in various other/additional ways for distributed security key management for protecting roaming data via a TPM. For instance, referring now to FIG. 1B, a block diagram of a system 100B is shown, according to embodiments. System 100B is configured for distributed security key management for protecting roaming data via a TPM, and is illustrated as an embodiment of system 100A of FIG. 1A. As shown in FIG. 1B, system 100B includes computing system 102 and computing system 108 described above for system 100A, where in system 100B, computing system 102 and computing system 108 are implemented in a processing cluster 114, such as a server cluster, and are enabled to communicate with each other over cluster communication infrastructure 116. It should also be noted here that various numbers of computing systems may be present in various embodiments. Additionally, any combination of the components illustrated in FIG. 1B may be present in system 100B, according to embodiments.

Cluster communication infrastructure 116 may comprise any number and/or type of communication links that connect computing devices and hosts/servers such as, but not limited to, wired or wireless networks and portions thereof, point-to-point connections, routers, switches, and/or the like.

Figure 2:
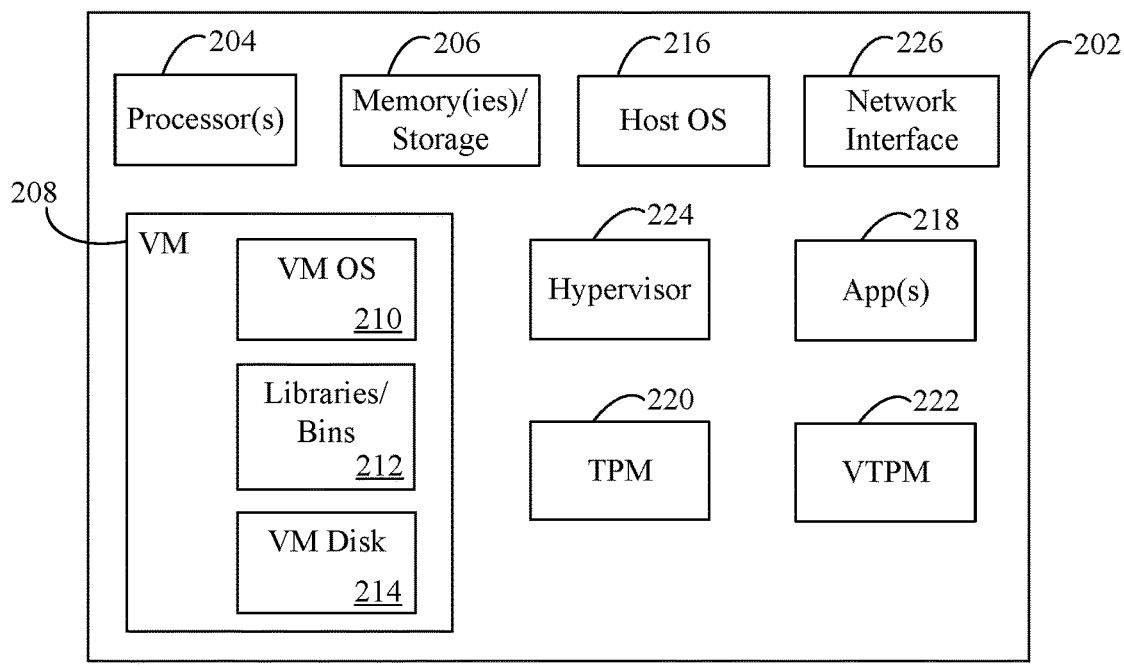
FIG. 2 shows a block diagram of a computing system configured for distributed security key management for protecting roaming data via a TPM, according to an example embodiment.
Figure 3:
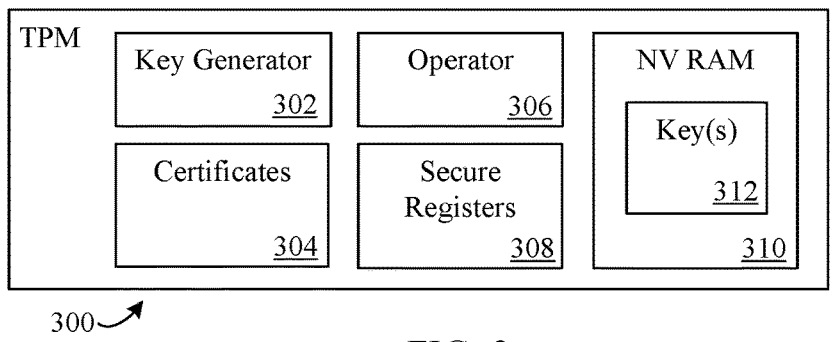
FIG. 3 shows a block diagram for the trusted platform module of FIG. 2 for distributed security key management for protecting roaming data, in accordance with an example embodiment.

Referring now to FIG. 2 and FIG. 3, computing system 102 and/or computing system 108 may be configured in various ways for distributed security key management for protecting roaming data via a TPM. For instance, FIG. 2 shows a block diagram of a system 200 for distributed security key management for protecting roaming data via a TPM, and FIG. 3 shows a TPM 300, according to example embodiments. System 200 may be an embodiment of system 100A of FIG. 1A and/or system 100B of FIG. 1B, e.g., computing system 102 and/or computing system 108, and TPM 300 may correspond to a TPM 220 in FIG. 2, each of which may be an embodiment of TPM 104 and/or TPM 110 in FIGS. 1A and 1B. System 200 and TPM 300 are described as follows.

System 200 includes a computing device 202, which may be an embodiment of computing system 102 and/or computing system 108, and which may be any type of server or computing device, as mentioned elsewhere herein, or as otherwise known. As shown in FIG. 2, computing device 202 may include one or more processors ("processor") 204, one or more of a memory and/or other physical storage device ("memory") 206, as well as one or more network interfaces ("network interface") 226. Computing device 202 includes a VM 208 that may be an embodiment of the VMs described for FIGS. 1A and 1B, a hypervisor 224, and TPM 220. Computing device 202 may also include or be configured to execute one or more software applications 218 (also "app(s)"), on or more of VTPM 222, and a hypervisor 224, in embodiments herein. These components of system 200 may be configured for distributed security key management for protecting roaming data, as described herein. In embodiments, app(s) 218 may be executed via a host operating system (OS) 216 and/or via VM 208.

System 200 may also include additional components (not shown for brevity and illustrative clarity) including, but not limited to, components and subcomponents of other devices and/or systems herein, as well as those described below with respect to FIG. 11.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of VM 208, hypervisor 224, and/or VTPM 222, including one or more of the components thereof as described herein, and/or application(s) 218, some or all of which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, host OS 216, VM 208, one or more of application(s) 218, VTPM 222, hypervisor 224, and/or the like. In embodiments, memory 206 may comprise secure or restricted portions of memory in which VM 208, one or more of application(s) 218, VTPM 222, hypervisor 224, and/or the like, are executed by processor 204.

Network interface 226 may be any type or number of wired and/or wireless network adapter, modem, etc., configured to enable system 200, including computing device 202, to communicate with other devices and/or systems over a network and/or a cluster communication infrastructure, as described herein.

Application(s) 218 may be any type of software application, such as email applications, productivity software, software application suites, services, microservices, etc. Application(s) 218 may be executed by processing device 202 and may run on host OS 216, in embodiments, and/or may be executed in the context of hypervisor 224 for VM 208, which may sit on top of host OS 216, described in further detail herein. As referred to herein, a software application may be one of application(s) 218. Host OS 216 may be any OS from any developer/publisher.

Hypervisor 224 is configured to manage access between the virtual system aspects and the physical hardware resources of computing device 202. For example, hypervisor 224 may sit on top of host OS 216 and manage, in a secured/isolated environment, aspects of execution, data storage, decryption, and/or the like, for instances of VM 208 and/or VTPM 222.

VM 208 of computing device 202 may include a plurality of components for distributed security key management in protecting roaming data via a TPM, such as TPM 220. For instance, VM 208 may comprise an image or file of a VM configured to be executed using processor 204 and memory 206. VM 208 is configured to execute in conjunction with TPM 220 and VTPM 222 for distributed security key management to protect roaming data. VM 208 is illustrated as including a VM OS 210, libraries/bins 212, and a VM disk 214. VM OS 210 may be any OS from any developer/publisher, and may be the same as or different than host OS 216, in embodiments, and may execute on top of hypervisor 224 for running instances of VM 208. Ones of application(s) 218 may be executed in the context of VM OS 210.

Libraries/bins 212 may include library files for VM execution and memory contents therefor. VM disk 214 may comprise one or more virtual hard disks (VDHs) and may store VM OS 210, libraries/bins 212, and/or any data and information associated with VM 208 and its execution. Data and information stored by VM disk 214 may be persisted for VM 208 execution, when data of VM disk 214 roams, and/or when data of VM disk 214 is at rest, internally or externally with respect to computing device 202 by memory 204 and/or other memory associated with a network or cluster implementation of which computing device 202 is a part.

TPM 220 may comprise a hardware-based technology device that is designed to provide security-related functions for a computing device. TPM 220 may be embodied as a chip or equivalent module in computing device 202, or as a secure software implementation, and may be configured to be utilized as a secure cryptoprocessor to carry out cryptographic operations. TPM 220 may include one or more secure registers, a key generator, memory, etc., further details of which are described below. Accordingly, TPM 220 may be configured for distributed security key management in protecting roaming data in conjunction with VM 208, as described herein.

VTPM 222 may be a virtual instance of TPM 220. In embodiments, each instance of VTPM 222 may correspond to an instance of VM 208 that is executing, or that was previously executing, at a computing device/system such as computing device 202. In various embodiments, any number of instances of VTPM 222 may be individually initialized based on TPM 220. Instances of VTPM 222 may be executed in conjunction with and/or stored in a secure portion of memory 206, as described herein, and may include state data of VTPM 222 instances comprising keys of a software application or service that are used to encrypt data of VM disk 214 for instances of VM 208.

Referring also now to FIG. 3, TPM 300 exemplarily includes a key generator 302, policies 304, an operator 306 and secure registers 308. Key generator 302 is configured to generate keys, e.g., cryptographic security keys, transfer key pairs (e.g., public and private transfer key portions), etc., to be utilized in distributed security key management in protecting roaming data. In embodiments, VM 208 of FIG. 2 may request and/or utilize cryptographic security keys for encrypting data associated therewith. Key generator 302 is configured to generate cryptographic security keys described herein. In embodiments, cryptographic security keys generated by key generator 302 are specific to TPMs, such as TPM 220 in FIG. 2 and TPM 300 in FIG. 3.

Certificates 304 may be stored by a TPM, such as TPM 300, according to embodiments. Ones of certificates 304 may be associated with public transfer keys such that other TPMs in a system or server cluster can verify the identity of the TPM that creates/owns the transfer key pairs, e.g., through an OS agent or OS such as OS 216 described above for FIG. 2. For example, when a public transfer key is provided to TPM 300 in association with providing the cryptographic security key from TPM 300 to a TPM of another system/server/device, the OS agent or the OS may validate the certification, and thus TPM 300 may verify the certificate received with the public transfer key is valid as a condition of encrypting the cryptographic security key and providing it to the other TPM. In some embodiments, one or more of certificates 304 may be stored in association with VM 208 in memory 206, as shown for FIG. 2, and may be provided to TPM 300 with a request for the cryptographic security key.

Operator 306 may be configured to perform operations for TPM 300 as described herein, including but without limitation, hashes of files or keys, resetting of values of secure registers 308, extending of hashes to secure registers 308, and/or the like. Secure registers 308 may include one or more registers of TPM 300, e.g., PCRs in embodiments, configured to provide secure storage of information within TPM 300.

As shown, TPM 300 also includes a non-volatile (NV) random access memory (RAM) 310 that stores, or is configured to store, one or more key(s) 312. Key(s) 312 may be keys, such as cryptographic security keys, transfer key pairs (including public and private transfer key portions), asymmetric keys, etc., generated by key generator 302, as described herein. In embodiments, a single cryptographic security key for encrypting/decrypting state data, as described herein, may be generated and utilized by a TPM and provided to other servers, processing systems, devices, etc., for similar operations and functions—that is, instead of creating new cryptographic security keys for each VM, embodiments provide for these TPM-based keys to be created and distributed only once. By storing/persisting key(s) 312 in NV-RAM 310, TPM 300 may prevent access or disclosure of key(s) 312 outside of TPM 300, thus adding an additional security measure to the protection of the data and information associated with a VM. In embodiments, key(s) 312 may comprise a data structure for storage thereof that maps the keys to their respective certificates and/or the like. Embodiments herein provide for VTPM 222 of computing device 202 to similarly be a virtual instance of TPM 220 and TPM 300 as VM 208 is a virtual instance of computing device 202.

It is also contemplated herein that TPM 300 may include additional components and features not shown for brevity and illustrative clarity, as would be understood by those of skill in the relevant art(s) having the benefit of this disclosure. While FIGS. 2 and 3 include described TPMs, it contemplated that, in lieu of and/or in addition to these TPMs, a hardware security module (HSM), any type of secure hardware and/or software-based cryptoprocessor, and/or another equivalent hardware security mechanism/module may be utilized in the computing devices/systems herein to generate and distribute security keys that protect data at rest and roaming data associated with the VMs during their transfer to a different host system and/or when otherwise not being executed.

While shown separately for illustrative clarity, in embodiments, one or more of the components of computing device 202 of FIG. 2 and/or TPM 300 of FIG. 3 may be combined together and/or as a part of other components of system 200 and/or TPM 300. In some embodiments, less than all of the components of computing device 202 and/or TPM 300 as illustrated may be included. In software implementations, one or more components of computing device 202 may be stored in memory 206, and may be executed by processor 204. Further details regarding computing device 202 and TPM 300, and their respective subcomponents, are described below.

Figure 4:
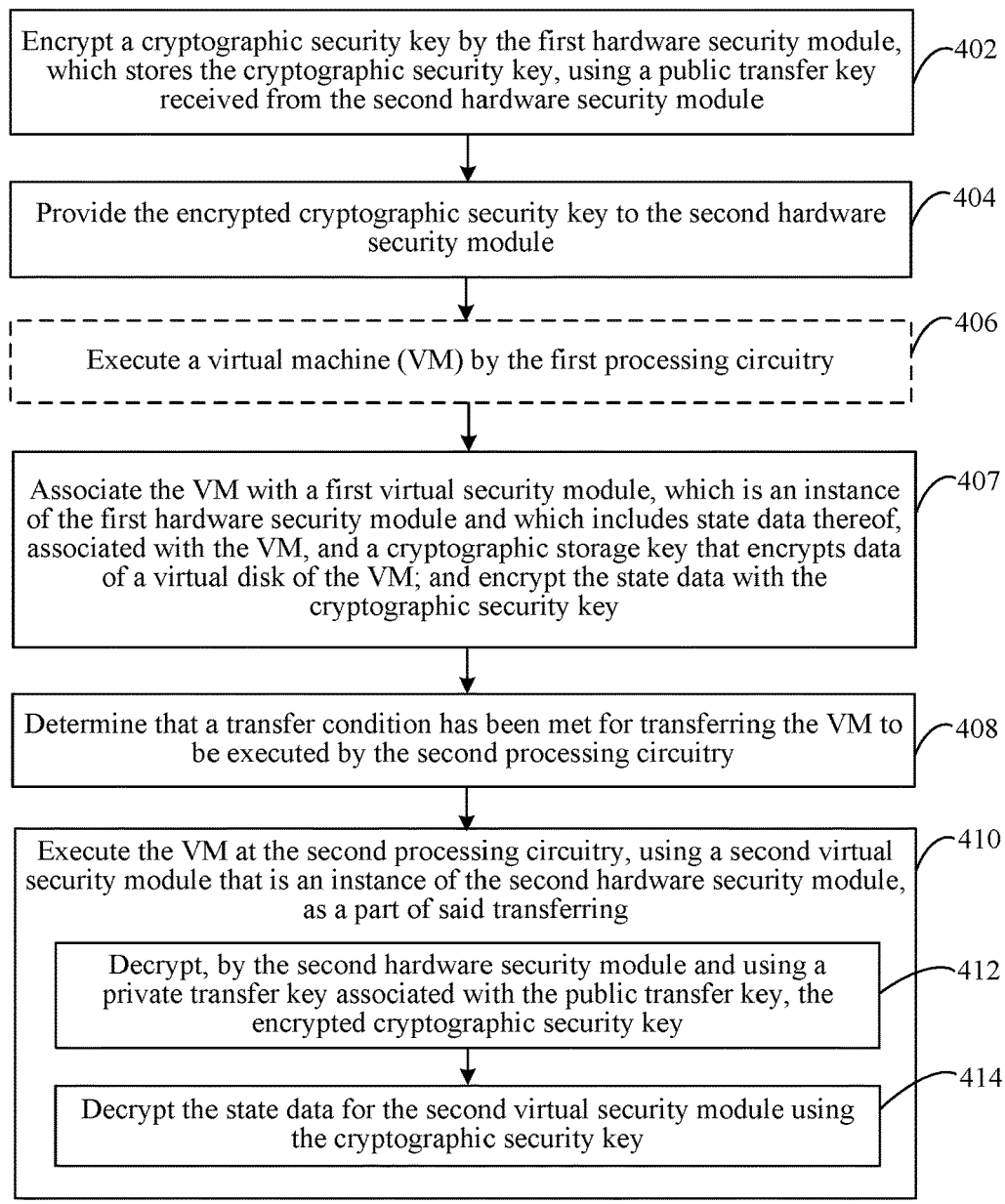
FIG. 4 shows a flowchart for distributed security key management for protecting roaming data via a TPM, in accordance with an example embodiment.
Figure 5:
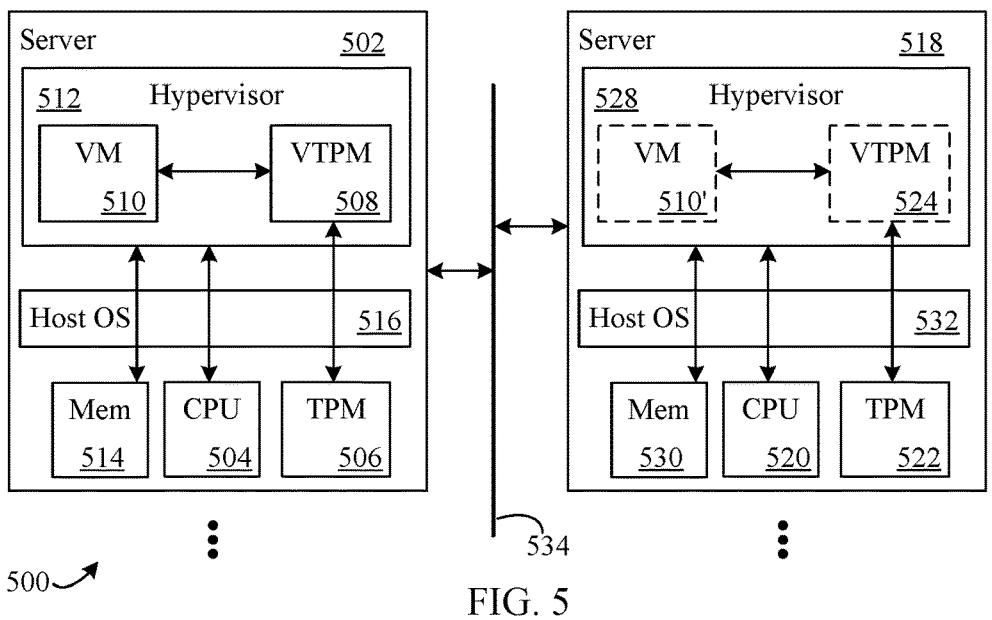
FIG. 5 shows a block diagram of a computing system for distributed security key management for protecting roaming data via a TPM, in accordance with an example embodiment.

As noted above for FIGS. 1A, 1B, 2, and 3, embodiments herein provide for distributed security key management for protecting roaming data via a TPM. System 100A of FIG. 1A, system 100B of FIG. 1B, system 200 of FIG. 2, and TPM 300 of FIG. 3 may each be configured to perform such functions and operations. FIGS. 4 and 5 will now be described with reference to these systems and devices.

FIG. 4 shows a flowchart 400, and FIG. 5 shows a block diagram of a computing system 500, each being for distributed security key management for protecting roaming data via a TPM, according to example embodiments. Computing system 500 is exemplarily illustrated as a server cluster that may be embodiments of system 100B in FIG. 1B, system 200 of FIG. 2, and/or TPM 300 of FIG. 3 and that includes two (of two or more) servers: a server 502 and a server 518 that communicate over communication infrastructure 534, which may be an embodiment of cluster communication infrastructure 116 in FIG. 1B. Further structural and operational examples will be apparent to persons skilled in the relevant art(s) based on the following descriptions.

Flowchart 400 is described as follows in the context of computing system 500 that includes first processing circuitry 504 of server 502, a first hardware security module 506 (exemplarily shown as a TPM) corresponding to first processing circuitry 504, second processing circuitry 520 of server 518, and a second hardware security module 522 (exemplarily shown as a TPM) corresponding to second processing circuitry 520.

Flowchart 400 begins at step 402. In step 402, a cryptographic security key is encrypted by the first hardware security module, which stores the cryptographic security key, using a public transfer key received from the second hardware security module. For example, TPM 506 may store and encrypt a cryptographic security key, as described above with respect to FIG. 3. The cryptographic security key may be encrypted using a public transfer key of a transfer key pair that is generated by TPM 522.

In step 404, the encrypted cryptographic security key is provided to the second hardware security module. For instance, with respect to FIG. 5, the encrypted cryptographic security key, encrypted by TPM 506 in step 402, may be provided from TPM 506 of server 502, via communication infrastructure 534, to TPM 522 of server 518 where the encrypted cryptographic security key may be stored and/or decrypted for later use by server 518.

In step 406, a virtual machine (VM) is executed by the first processing circuitry. For instance, VM 510 may be executed by server 502 as shown in FIG. 5. VM 510 may be managed in its execution by a hypervisor 512, which sits atop a host OS 516 of server 502, and may utilize a memory 514 and first processing circuitry 504 for execution. In embodiments, step 406 is optional and may or may not be performed. As a non-limiting example, a VM process that is stopped or terminated on an initially-executing server may have its corresponding state data and virtual disk data transferred to a first server having the first processing circuitry based on a prior transfer condition of the initially-executing server. However, the first server may not execute the VM and may further transfer the state data and the virtual disk data to a second server based on a transfer condition of the first server, as described below for flowchart 400.

In step 407, the VM is associated with a first virtual security module, which is an instance of the first hardware security module and which includes state data thereof, associated with the VM, and a cryptographic storage key that encrypts data of a virtual disk of the VM; and the state data is encrypted with the cryptographic security key. As shown in FIG. 5, a VTPM 508 of server 502 is a virtual instance of TPM 506 that executes in association with VM 510 through hypervisor 512. VTPM 508 includes state data thereof that includes a cryptographic storage key generated by a service or software running on VM 510 that is utilized to encrypt a virtual disk of VM 510 (e.g., as described for VM 208 in FIG. 2). In embodiments, hypervisor 512, via VTPM 508, is configured to encrypt the state data using the cryptographic security key. In other words, the cryptographic storage key and other state data/information are encrypted by the cryptographic security key stored by TPM 506, and encrypted version of which is provided to TPM 522, as described in step 404 above.

In step 408, it is determined that a transfer condition has been met for transferring the VM to be executed by the second processing circuitry. For example, server 502 may be scheduled for migration and/or maintenance which includes time spent offline and/or shut down by the server. In such cases, when the server goes offline or is shut down, VMs executing thereon are terminated and any associated data stored by their virtual disks will be at rest or will roam to another server in computing system 500. As another example, fail-over conditions may be determined for a computing device/system executing a VM(s). In one scenario, server 502 may unexpectedly crash or otherwise be shut down, and in such cases a transfer of VM 510 to another server is needed. Determinations for transfers may be based on network/cluster monitoring, scheduling, an administrator input/information, and/or the like, in different embodiments.

In step 410, the VM is executed at the second processing circuitry, using a second virtual security module that is an instance of the second hardware security module, as a part of said transferring. For instance, VM 510 may be transferred from server 502 to server 518 based on the determination made in step 408. Server 518 is configured to execute VM 510 as a VM 510', denoting the same VM in a transferred state, in conjunction with a VTPM 524. VM 510' may be managed in its execution by a hypervisor 528, which sits atop a host OS 532 of server 518, and may utilize a memory 530 and second processing circuitry 520 for execution. As shown in FIG. 5, VTPM 524 of server 502 is a virtual instance of TPM 522 that executes in association with VM 510' through hypervisor 528. VTPM 524 may include the state data of VTPM 508, which is also transferred to server 518 and used for execution of VM 510', including the cryptographic storage key that is utilized to encrypt a virtual disk of VM 510' (e.g., as described for VM 208 in FIG. 2). In embodiments, step 410 is based at least in part on step 412 and step 414.

In step 412, the encrypted cryptographic security key is decrypted by the second hardware security module and using a private transfer key associated with the public transfer key. For example, TPM 522 includes the private transfer key portion of the key pair for which the public transfer key portion was provided to TPM 506 of server 502 to encrypt the cryptographic security key. Using the private transfer key portion, TPM 522 is configured to decrypt the cryptographic security key in order to access the state data, and subsequently the virtual disk, in the execution of VM 510'.

In step 414, the state data for the second virtual security module is decrypted using the cryptographic security key. For instance, hypervisor 528 of server 518 is configured to decrypt the state data using the now-decrypted cryptographic security key. In other words, the cryptographic storage key enables the provision of the decrypted state data to be provided to VTPM 524 for the execution of VM 510' and access to the virtual disk. As will be understood based on the description above, virtual TPMs have associated states that may include data describing the current execution of the virtual TPM and security storage keys used to encrypt and protect data and information in virtual disks of the VMs. The state data and information is transferred to the target server with the transfer of the VM and also needs protection during these times at rest and roaming.

One or more of the illustrative, exemplary steps shown in flowchart 400 of FIG. 4 may not be performed in embodiments. Moreover, steps or operations, in addition to or in lieu of those illustrated in flowchart 400 and described above, may be performed. Further, in embodiments, one or more operations of flowchart 400 may be performed out of order, in an alternate sequence, or partially (or completely) concurrently with each other or with other operations. For instance, step 402 is performed prior to step 404 in embodiments as the encrypted cryptographic security key is provided after its encryption; step 404 is performed prior to step 412 in embodiments as the encrypted cryptographic security key is decrypted after receipt thereof; and step 412 is performed prior to step 414 in embodiments as the decrypted cryptographic security key is used subsequent to its decryption. Similarly, step 406 is performed prior to step 408 in embodiments, e.g., when optional step 406 is performed, as execution of the VM on the first processing circuitry occurs prior to determining the transfer condition being met; and step 408 is performed prior to step 410 in embodiments, e.g., for execution of the VM on the second processing circuitry, as such execution occurs after determining the transfer condition is met in some scenarios. Likewise, embodiments herein also contemplate that step 410 may be performed prior to, concurrently or partially-concurrently, or subsequent to other steps of flowchart 400 in FIG. 4. As an example, step 410 may initialize and begin executing the VM prior to step 402 and/or step 404; that is, initializing execution of a VM at a transfer target may take place prior to receiving the cryptographic security key that has been encrypted, prior to the transfer condition being met, etc., and in such scenarios, the VM may wait in an idle state for one or more steps of flowchart 400 to be performed before step 412 and step 414 are performed (which will enable the VM to continue execution in association with the state data and the data of the virtual disk as VM 510').

Additionally, any of step 402, step 404, step 412, and/or step 414 may start or be performed prior to optional step 406 and/or step 408, in embodiments. For instance, as non-limiting scenarios, by way of example and not limitation, the following orders of steps for flowchart 400 are contemplated in embodiments: step 408, step 402, step 404, and step 410 (followed by step 412 then step 414); step 408, step 402, step 404, and step 410 (followed by step 412 then step 414); step 402, step 408, step 404, and step 410 (followed by step 412 and then step 414); step 408, step 406, step 402, step 404, and step 410 (followed by step 412 and then step 414); step 406, step 408, step 402, step 404, and step 410 (followed by step 412 and then step 414); step 402, step 408, step 404, and step 410 (followed by step 412 and then step 414); etc. That is, embodiments herein contemplate that optional step 406, step 408, and both of steps 402 and 404 may be performed in various orders, or concurrently/partially-concurrent with respect to each other and before step 410 (which is followed by step 412 then step 414).

Figure 6:
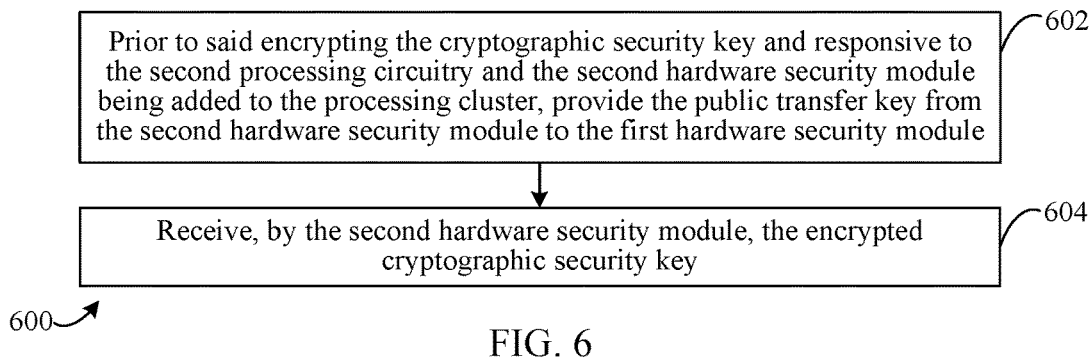
FIG. 6 shows a flowchart for distributed security key management for protecting roaming data via a TPM, in accordance with an example embodiment.

FIG. 6 will now be described in the context of flowchart 400 of FIG. 4. FIG. 6 shows a flowchart 600 for distributed security key management for protecting roaming data via a TPM, according to example embodiments. The systems, servers, and computing devices described herein may operate according to flowchart 600, in embodiments. Further structural and operational examples will be apparent to persons skilled in the relevant art(s) based on the following descriptions. Flowchart 600 may be an embodiment of flowchart 400 of FIG. 4, and is described as follows.

Flowchart 600 begins with step 602. In step 602, prior to said encrypting the cryptographic security key and responsive to the second processing circuitry and the second hardware security module being added to the processing cluster, provide the public transfer key from the second hardware security module to the first hardware security module. For instance, step 602 may be performed prior to step 402 of flowchart 400 and responsive to a server being added to a server cluster (by way of non-limiting example). In view of FIG. 5 and computing system 500 as an illustrative embodiment, TPM 506 is configured to encrypt the cryptographic security key using the public transfer key provided from TPM 522 in server 518. In some scenarios, however, prior to this encryption, server 518 may not be online in computing system 500. When server 518 is added to computing system 500 (along with second processing circuitry 520 and TPM 522 therein), TPM 522 needs a copy of the cryptographic security key generated by TPM 506 in order for server 518 to be a candidate for VM transfers. Accordingly, TPM 522 is configured to provide it public transfer key to TPM 506 as a request to receive the cryptographic security key of TPM 506 (as described above in flowchart 400).

In step 604, the encrypted cryptographic security key is received by the second hardware security module. For example, subsequent to step 404 of flowchart 400 described above, TPM 506 provides its encrypted cryptographic security key to TPM 522 where the cryptographic security key is encrypted with the public transfer key of TPM 522.

Figure 7:
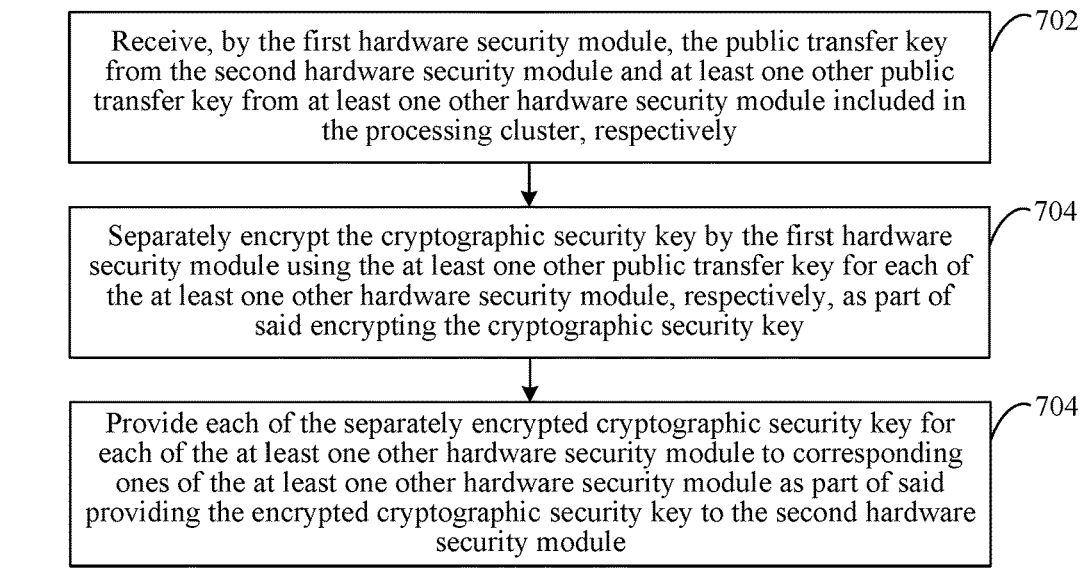
FIG. 7 shows a flowchart for distributed security key management for protecting roaming data via a TPM, in accordance with an example embodiment.

FIG. 7 will now be described in the context of flowchart 400 of FIG. 4. FIG. 7 shows a flowchart 700 for distributed security key management for protecting roaming data via a TPM, according to example embodiments. The systems, servers, and computing devices described herein may operate according to flowchart 700, in embodiments. Further structural and operational examples will be apparent to persons skilled in the relevant art(s) based on the following descriptions. Flowchart 700 may be an embodiment of flowchart 400 of FIG. 4, and is described as follows.

Flowchart 700 begins with step 702. In step 702, the public transfer key is received by the first hardware security module from the second hardware security module and at least one other public transfer key is received from at least one other hardware security module included in the processing cluster, respectively. For instance, prior to step 402 of flowchart 400, TPM 506 of server 502 in computing system 500 may receive the public transfer key of TPM 522 of server 518 and respective public transfer keys of one or more additional TPMs in additional servers of computing system 500. That is, embodiments allow for each server in a server cluster (or each processing system/device in a related group thereof, generally) to provide a public transfer key to a TPM of another server to initiate the exchange of cryptographic security keys, as described herein. In one example, this scenario efficiently populates the cryptographic security key of TPM 506 when server 502 is added to the server cluster represented by computing system 500.

In step 704, the cryptographic security key is separately encrypted by the first hardware security module using the at least one other public transfer key for each of the at least one other hardware security module, respectively, as part of said encrypting the cryptographic security key. For example, step 402 of flowchart 400 may also include to provide individual copies of a TPM's cryptographic security key to each other TPM of servers in the server cluster where each individual copy is respectively encrypted by each other TPM's public transfer key. In other words, step 704 provides for step 402 to essentially be iterated for the different public transfer keys of other TPMs for the cryptographic security key of the TPM that receives the public transfer keys. In reference to FIG. 5, TPM 506 encrypts its cryptographic security key based on receiving the public transfer key of TPM 522, and then TPM 506 encrypts its cryptographic security key again but with a received public transfer key of another TPM of a different server in computing system 500.

In step 706, each of the separately encrypted cryptographic security key for each of the at least one other hardware security module is provided to corresponding ones of the at least one other hardware security module as part of said providing the encrypted cryptographic security key to the second hardware security module. For instance, TPM 506 encrypts its cryptographic security key a given number of times in step 704 for each other TPM in computing system 500 that provided a public transfer key, and accordingly, TPM 506 provides these TPM-specific encrypted copies of its cryptographic security key to the corresponding TPMs.

In this way, each TPM of each server in computing system 500 receives the cryptographic security key of TPM 506, which allows for each other server to be a transfer candidate for VM 510, all while ensuring that each other TPM in the system receives the cryptographic security key encrypted in a way that can only be decrypted by a corresponding private transfer key maintained by each other TPM, respectively.

Figure 8:
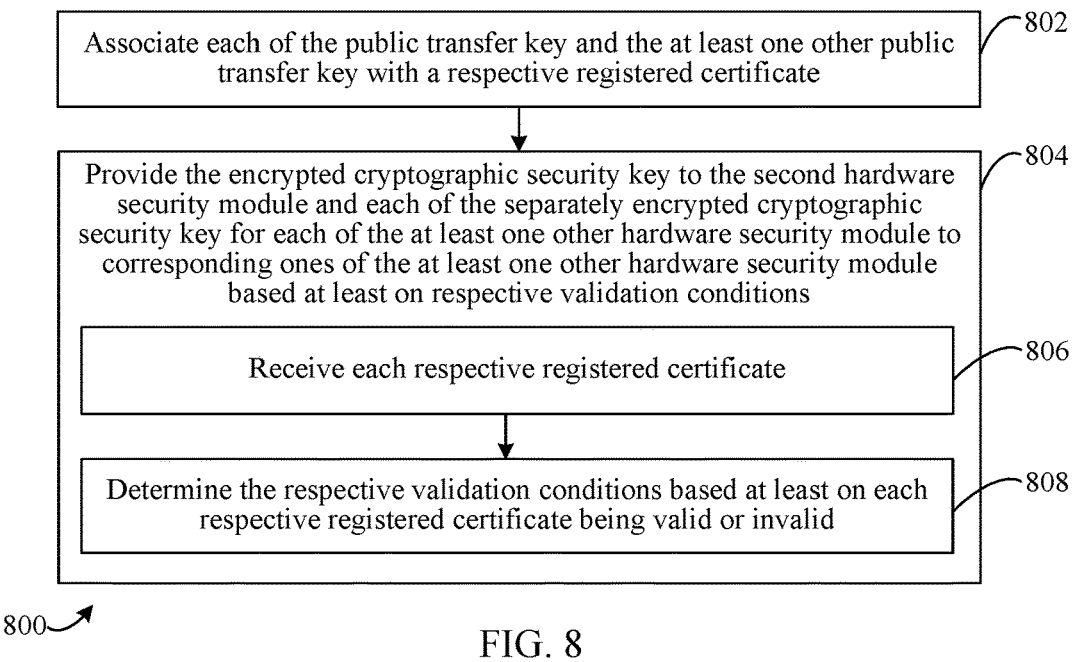
FIG. 8 shows a flowchart for distributed security key management for protecting roaming data via a TPM, in accordance with an example embodiment.

FIG. 8 will now be described in the context of flowchart 400 of FIG. 4 and flowchart 700 of FIG. 7. FIG. 8 shows a flowchart 800 for distributed security key management for protecting roaming data via a TPM, according to example embodiments. The systems, servers, and computing devices described herein may operate according to flowchart 800, in embodiments. Further structural and operational examples will be apparent to persons skilled in the relevant art(s) based on the following descriptions. Flowchart 800 may be an embodiment of flowchart 400 and/or flowchart 700, and is described as follows.

Flowchart 800 begins with step 802. In step 802, each of the public transfer key and the at least one other public transfer key are associated with a respective registered certificate. For example, certificates may be generated by server cluster administrators as being associated with the public transfer key, and as noted herein, to ensure that only physical TPMs of approved servers in a server cluster can receive an encrypted cryptographic security key, servers are enabled share registered certificates for their respective public transfer key portions. In this way, a server distributing a cryptographic security key may validate the provided certificate to ensure it belongs to a TPM it trusts in order for that TPM to receive the cryptographic security key. The certificates may include respective public transfer key portions, which can be used for the subsequent operations of the embodiments herein.

In step 804, the encrypted cryptographic security key is provided to the second hardware security module and each of the separately encrypted cryptographic security key for each of the at least one other hardware security module is provided to corresponding ones of the at least one other hardware security module based at least on respective validation conditions. For instance, to ensure that only TPMs of approved servers in a server cluster can receive an encrypted cryptographic security key form any given TPM, servers are enabled to share registered certificates for their public transfer keys. Certificates may be digitally signed as corresponding to a specific server or TPM, and may be provided with the public transfer key in a request for a cryptographic security key, or may be otherwise distributed (e.g., when a server comes online or is added to a server cluster). Additionally, a list of trusted TPMs or servers may be included with a TPM of a given server when brought online or otherwise added to a server cluster, and such a list may be used to verify the registered certificate received with the public transfer key. For example, step 804 may include step 806 and/or step 808, in embodiments.

In step 806, each respective registered certificate is received. In view of FIG. 5 and computing system 500, server 502 may receive registered certificates associated with each other TPM of each other server in the server cluster (although embodiments herein also contemplate receiving less than all certificates).

In step 808, the respective validation conditions are determined based at least on each respective registered certificate being valid or invalid. As noted above, a server may be provided with a list of trusted servers/TPMs in its group or cluster, and may check received registered certificates against the trusted list in order to validate or invalidate each of the received registered certificates.

Figure 9:
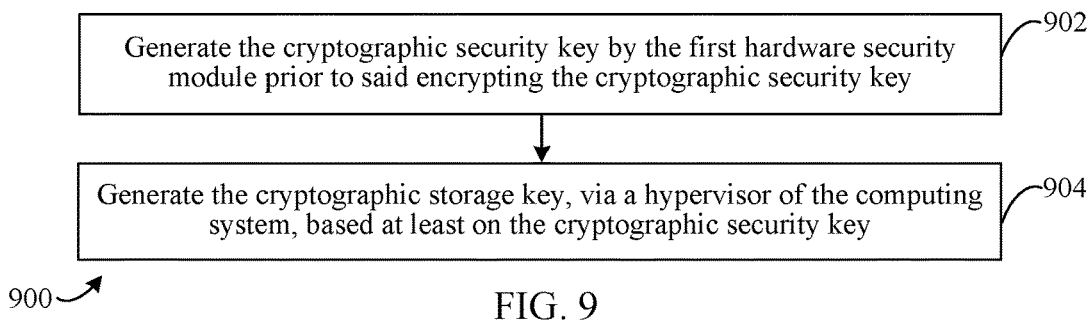
FIG. 9 shows a flowchart for distributed security key management for protecting roaming data via a TPM, in accordance with an example embodiment.

FIG. 9 will now be described in the context of system 200 of FIG. 2, TPM 300 of FIG. 3, and flowchart 400 of FIG. 4. FIG. 9 shows a flowchart 900 for distributed security key management for protecting roaming data via a TPM, according to example embodiments. The systems, servers, and computing devices described herein may operate according to flowchart 900, in embodiments. Further structural and operational examples will be apparent to persons skilled in the relevant art(s) based on the following descriptions. Flowchart 900 may be an embodiment of flowchart 400, and is described as follows.

Flowchart 900 begins with step 902. In step 902, the cryptographic security key is generated by the first hardware security module prior to said encrypting the cryptographic security key. For example, as described herein, a TPM is configured to generate a cryptographic security key that may be used to encrypt state data of a VTPM, which may include a cryptographic storage key that encrypts data of a virtual disk for the VM associated with the VTPM. As described for TPM 300, key generator 302 may generate such cryptographic security keys.

In step 904, the cryptographic storage key is generated via a hypervisor of the computing system based at least on the cryptographic security key. For instance, secure memory portions of systems that are managed and utilized by hypervisors may also be used in the generation of cryptographic storage keys. Hypervisor 224 of FIG. 2, along with other hypervisor embodiments described herein (e.g., in FIG. 5), may thus be utilized to generate the cryptographic storage key that encrypts data of a virtual disk for a VM. In embodiments, an application or service in a VM OS that is managed by a hypervisor may generate cryptographic storage keys based at least on the cryptographic security key generated by a TPM of which a VTPM is an instance where the VTPM is executed in association with a VM. In embodiments, cryptographic storage keys may be derived/generated based on any type of key derivation function/algorithm. As one non-limiting example, cryptographic storage keys may be derived/generated based on a hash function (e.g., a one-way hash) that takes a cryptographic security key (as a key derivation key) and one or more of global data, e.g., a known globally unique identifier (GUID), or data specific to the VM, as inputs (e.g., as "salt" data) and where the output of the hash function is a cryptographic storage key.

Figure 10:
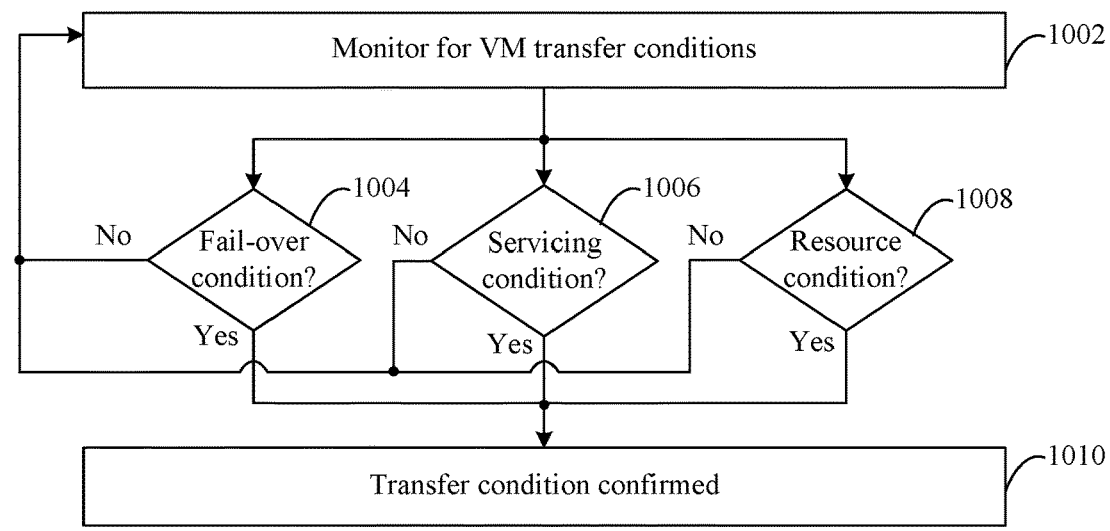
FIG. 10 shows a flow diagram for distributed security key management for protecting roaming data via a TPM, in accordance with an example embodiment.

FIG. 10 will now be described in the context of system 200 of FIG. 2 and flowchart 400 of FIG. 4. FIG. 10 shows a flow diagram 1000 for distributed security key management for protecting roaming data via a TPM, according to example embodiments. The systems, servers, and computing devices described herein may operate according to flow diagram 1000, in embodiments. Further structural and operational examples will be apparent to persons skilled in the relevant art(s) based on the following descriptions. Flow diagram 1000 may be an embodiment of flowchart 400, and is described as follows.

Flow diagram 1000 begins with step 1002. In step 1002, a system that executes a VM, according to embodiments herein, is monitored for transfer conditions. For instance, system performance monitors, network monitors, administrator tools, and/or the like, as would be understood by those of skill in the relevant art(s) based on the disclosure herein, may monitor a system that executes a VM in accordance with embodiments for distributed security key management for protecting roaming data via a TPM. Monitoring for transfer conditions may include, without limitation, monitoring changes in resource utilization, identifying scheduled maintenance or upgrades or other planned down-time for a system, detecting a system fail-over (e.g., a crash or unplanned shutdown), and/or the like.

In step 1004, it is determined if a fail-over process associated with the first processing circuitry executing the VM is present as a transfer condition. If not, flow diagram 1000 returns to step 1002. In step 1006, it is determined if a resource condition is present that requires a migration of the VM. For example, a need for balancing of processing resources and/or a balancing of memory resources may indicate a transfer condition is met. If not, flow diagram 1000 returns to step 1002. In step 1008, it is determined if a servicing associated with the first processing circuitry of the system executing the VM that requires a migration of the VM is present. For example, scheduled maintenance, upgrades, or other planned down-time may be determined. If not, flow diagram 1000 returns to step 1002.

If positive determinations for one or more of step 1004, step 1006, or step 1008 are made, flow diagram 1000 continues to step 1010. In step 1010, a transfer condition is confirmed, and the transfer of the VM, including state data of an associated VTPM and virtual disk data of the VM, is initiated and performed where the VM is transferred to a new server, computing device, system, and/or the like, for execution, as described for the embodiments herein.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100A of FIG. 1A, system 100B of FIG. 1B, system 200 of FIG. 2, TPM 300 of FIG. 3, computing system 500 of FIG. 5, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
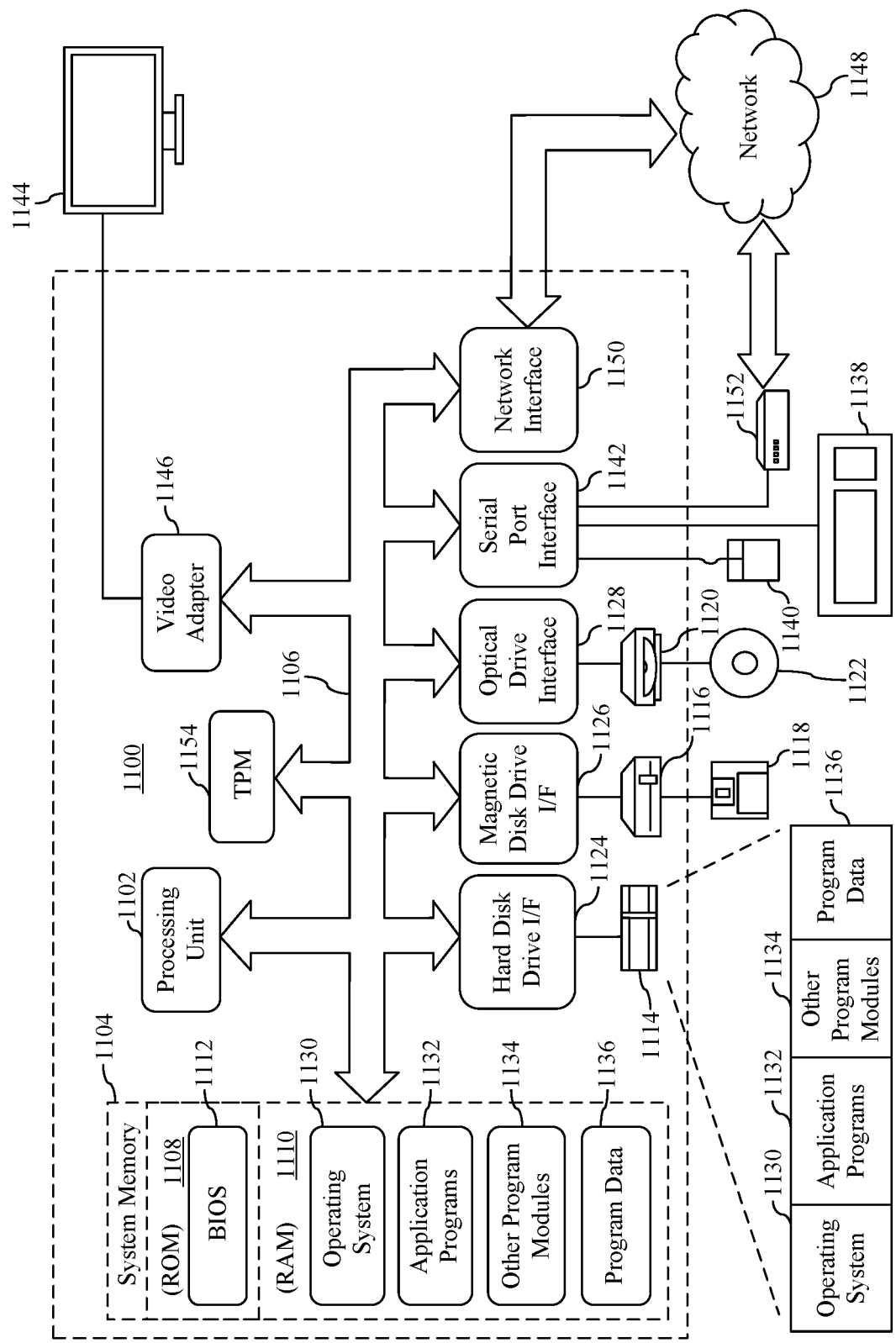
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100A of FIG. 1A, system 100B of FIG. 1B, system 200 of FIG. 2, TPM 300 of FIG. 3, computing system 500 of FIG. 5, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

TPM 1154 may be connected to bus 1106, and may be an embodiment of TPM 220 of FIG. 2 and/or TPM 300 of FIG. 3, as described herein.

As used herein, the terms "computer program medium," "computer-readable medium," "computer-readable storage medium," "computer-readable storage media," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media, computer-readable storage media, etc., are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for distributed security key management for protecting roaming data via a TPM or an equivalent mechanism. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The described embodiments combine new methods of distributed security key management for protecting roaming data via a TPM, e.g., utilizing encryption keys generated by a TPM, for secure distribution of keys and transfers of VMs, such as between servers in a server cluster. The embodiments described herein are equally adaptable to planned migrations of VMs and transfers of VMs based on fail-over conditions. Embodiments herein are also applicable to mobile and personal devices, and not just to computing devices such as servers, and/or the like. In such embodiments, a mobile TPM may be embedded in a mobile device to be utilized in operations described here.

A TPM may be embodied as a chip or equivalent hardware module that may be utilized as a secure cryptoprocessor to carry out cryptographic operations via various physical security mechanisms that make the TPM tamper resistant with respect to bad actors. Additionally, malicious software is unable to tamper with the security functions of the TPM. Some example advantages of utilizing a TPM in the context of protecting keys and information include, without limitation, the ability to generate, store, transmit/share, and limit the use of cryptographic keys, the availability of secure registers (e.g., PCRs), and ensuring platform integrity by taking and storing security measurements, e.g., for key creation and use. TPM-based keys can be configured to be unavailable outside of a TPM which may prevent the keys from being copied and used without a TPM.

The additional examples and embodiments described in this Section may be applicable to examples disclosed in any other Section or subsection of this disclosure.

Embodiments in this description provide for systems, devices, and methods for distributed security key management for protecting roaming data via a TPM. For instance, a method performed by a computing system that includes first processing circuitry, a first hardware security module corresponding to the first processing circuitry, second processing circuitry, and a second hardware security module corresponding to the second processing circuitry is described herein. The method includes encrypting a cryptographic security key by the first hardware security module, which stores the cryptographic security key, using a public transfer key received from the second hardware security module, providing the encrypted cryptographic security key to the second hardware security module, determining that a transfer condition has been met for transferring a virtual machine (VM) to be executed by the second processing circuitry, the VM having a first virtual security module associated therewith, which is an instance of the first hardware security module, the first virtual security module having state data associated with the VM that includes a cryptographic storage key that encrypts data of a virtual disk of the VM, and the state data being encrypted with the cryptographic security key, and executing the VM at the second processing circuitry, using a second virtual security module that is an instance of the second hardware security module, as a part of transferring, based at least in part on: decrypting, by the second hardware security module and using a private transfer key corresponding to the public transfer key, the encrypted cryptographic security key, and decrypting the state data for the second virtual security module using the cryptographic security key.

In an embodiment of the method, the computing system comprises a processing cluster, and the method includes prior to encrypting the cryptographic security key and responsive to the second processing circuitry and the second hardware security module being added to the processing cluster, providing the public transfer key from the second hardware security module to the first hardware security module, and receiving, by the second hardware security module, the encrypted cryptographic security key.

In an embodiment of the method, the computing system comprises a processing cluster, and the method further includes receiving, by the first hardware security module, the public transfer key from the second hardware security module and at least one other public transfer key from at least one other hardware security module included in the processing cluster, respectively. In the embodiment, encrypting the cryptographic security key also includes separately encrypting the cryptographic security key by the first hardware security module using the at least one other public transfer key for each of the at least one other hardware security module, respectively, and providing the encrypted cryptographic security key to the second hardware security module also includes providing each of the separately encrypted cryptographic security key for each of the at least one other hardware security module to corresponding ones of the at least one other hardware security module.

In an embodiment of the method, each of the public transfer key and the at least one other public transfer key are associated with a respective registered certificate, and providing is based at least on respective validation conditions. In the embodiment, the method further includes receiving each respective registered certificate, and determining the respective validation conditions based at least on each respective registered certificate being valid or invalid.

In an embodiment of the method, the cryptographic security key is the only security key for the first hardware security module utilized in the computing system for encrypting and decrypting the state data; or the method includes executing the VM by the first processing circuitry prior to said determining.

In an embodiment, the method further includes generating the cryptographic security key by the first hardware security module prior to encrypting the cryptographic security key. In the embodiment, the first hardware security module and the second hardware security module are respective trusted platform modules (TPMs), or the method further includes generating the cryptographic storage key, via a hypervisor of the computing system, based at least on the cryptographic security key.

In an embodiment of the method, the transfer condition is associated with a migration of the VM to the second processing circuitry based at least on one or more of a balancing of processing resources, a balancing of memory resources, or a servicing associated with the first processing circuitry; or the transfer condition is based at least on a fail-over process associated with the first processing circuitry executing the VM.

A system is also described herein. The system includes first processing circuitry, a first hardware security module corresponding to the first processing circuitry, second processing circuitry, and a second hardware security module corresponding to the second processing circuitry. The first processing circuitry is configured to execute a virtual machine (VM) with a first virtual security module that is associated therewith and that is an instance of the first hardware security module, the first virtual security module having state data associated with the VM that includes a cryptographic storage key that encrypts data of a virtual disk of the VM, the state data being encrypted with the cryptographic security key. In the system, the first hardware security module storing a cryptographic security key, and the second hardware security module stores a public transfer key and a private transfer key linked thereto. The first hardware security module is configured to encrypt the cryptographic security key using the public transfer key received from the second hardware security module, and provide the encrypted cryptographic security key to the second hardware security module. The second hardware security module is configured to decrypt, using the private transfer key, the encrypted cryptographic security key, and the second processing circuitry is configured to execute the VM, subsequent to a transfer thereof from the first processing circuitry, with a second virtual security module that is an instance of the second hardware security module and based at least on the state data being decrypted for the second virtual security module using the cryptographic security key.

In an embodiment, the system is part of a processing cluster, the second hardware security module is configured to provide the public transfer key to the first hardware security module prior to encrypting the cryptographic security key and responsive to the second processing circuitry and the second hardware security module being added to the processing cluster, and to receive the encrypted cryptographic security key.

In an embodiment of the system, the system is part of a processing cluster, and the first hardware security module is configured to receive the public transfer key from the second hardware security module and at least one other public transfer key from at least one other hardware security module included in the processing cluster, respectively, separately encrypt the cryptographic security key using the at least one other public transfer key for each of the at least one other hardware security module, respectively, and provide each of the separately encrypted cryptographic security key for each of the at least one other hardware security module to corresponding ones of the at least one other hardware security module.

In an embodiment of the system, each of the public transfer key and the at least one other public transfer key are associated with a respective registered certificate, and the first hardware security module being configured to provide the encrypted cryptographic security key and each of the separately encrypted cryptographic security key based at least on respective validation conditions that comprise determinations for each respective registered certificate being valid or invalid.

In an embodiment of the system, the cryptographic security key is the only security key for the first hardware security module utilized in the computing system for encrypting and decrypting the state data.

In an embodiment of the system, the first hardware security module is configured to generate the cryptographic security key prior to encryption thereof. In the embodiment, the first hardware security module and the second hardware security module comprise respective trusted platform modules (TPMs), or the cryptographic storage key is generated via hypervisor of the computing system based at least on the cryptographic security key.

In an embodiment of the system, the transfer is associated with a migration of the VM to the second processing circuitry based at least on one or more of: a balancing of processing resources, a balancing of memory resources, or a servicing associated with the first processing circuitry; or the transfer is based at least on a fail-over process associated with the first processing circuitry executing the VM.

Computer-readable storage media having program instructions recorded thereon that, when executed by a processing system that includes first processing circuitry, a first hardware security module corresponding to the first processing circuitry, second processing circuitry, and a second hardware security module corresponding to the second processing circuitry, perform a method, are also described. The method includes encrypting a cryptographic security key by the first hardware security module, which stores the cryptographic security key, using a public transfer key received from the second hardware security module, providing the encrypted cryptographic security key to the second hardware security module, determining that a transfer condition has been met for transferring a virtual machine (VM) to be executed by the second processing circuitry, the VM having a first virtual security module associated therewith, which is an instance of the first hardware security module, the first virtual security module having state data associated with the VM that includes a cryptographic storage key that encrypts data of a virtual disk of the VM, and the state data being encrypted with the cryptographic security key, and executing the VM at the second processing circuitry, using a second virtual security module that is an instance of the second hardware security module, as a part of transferring, based at least in part on: decrypting, by the second hardware security module and using a private transfer key corresponding to the public transfer key, the encrypted cryptographic security key, and decrypting the state data for the second virtual security module using the cryptographic security key.

In an embodiment of the computer-readable storage media, the processing system is part of a processing cluster, and the method further includes prior to encrypting the cryptographic security key and responsive to the second processing circuitry and the second hardware security module being added to the processing cluster, providing the public transfer key from the second hardware security module to the first hardware security module, and receiving, by the second hardware security module, the encrypted cryptographic security key.

In an embodiment of the computer-readable storage media, the processing system is part of a processing cluster, and the method further includes receiving, by the first hardware security module, the public transfer key from the second hardware security module and at least one other public transfer key from at least one other hardware security module included in the processing cluster, respectively. In the embodiment, encrypting the cryptographic security key also includes separately encrypting the cryptographic security key by the first hardware security module using the at least one other public transfer key for each of the at least one other hardware security module, respectively, and providing the encrypted cryptographic security key to the second hardware security module also includes providing each of the separately encrypted cryptographic security key for each of the at least one other hardware security module to corresponding ones of the at least one other hardware security module.

In an embodiment of the computer-readable storage media, each of the public transfer key and the at least one other public transfer key are associated with a respective registered certificate, providing is based at least on respective validation conditions, and the method further includes receiving each respective registered certificate, and determining the respective validation conditions based at least on each respective registered certificate being valid or invalid.

In an embodiment of the computer-readable storage media, the cryptographic security key is the only security key for the first hardware security module utilized in the processing system for encrypting and decrypting the state data; or the method includes executing the VM by the first processing circuitry prior to said determining.

In an embodiment of the computer-readable storage media, the method further includes generating the cryptographic security key by the first hardware security module prior to encrypting the cryptographic security key. In the embodiment, the first hardware security module and the second hardware security module comprise respective trusted platform modules (TPMs); or the method further includes generating the cryptographic storage key, via a hypervisor of the processing system, based at least on the cryptographic security key.

What is claimed is:

1. A method, performed by a computing system that includes first processing circuitry, a first hardware security module corresponding to the first processing circuitry, second processing circuitry, and a second hardware security module corresponding to the second processing circuitry, the method comprising:

encrypting, by the first hardware security module using a public transfer key received from the second hardware security module, a cryptographic security key stored by the first hardware security module, wherein a private transfer key corresponding to the public transfer key is stored by the second hardware security module;
providing the encrypted cryptographic security key to the second hardware security module;
determining that a transfer condition has been met for transferring a virtual machine (VM) to be executed by the second processing circuitry, wherein the VM is associated with a first virtual security module that is an instance of the first hardware security module, the first virtual security module having state data associated with the VM that includes a cryptographic storage key that encrypts data of a virtual disk of the VM, the state data describing a current execution of the first virtual security module and being encrypted with the cryptographic security key;
decrypting, by the second hardware security module and using the private transfer key, the encrypted cryptographic security key;
decrypting the state data for the second virtual security module using the cryptographic security key; and
executing the VM at the second processing circuitry using a second virtual security module that is an instance of the second hardware security module.

2. The method of claim 1, wherein the computing system comprises a processing cluster;
the method further comprising:
prior to said encrypting the cryptographic security key and responsive to the second processing circuitry and the second hardware security module being added to the processing cluster, providing the public transfer key from the second hardware security module to the first hardware security module; and
receiving, by the second hardware security module, the encrypted cryptographic security key.

3. The method of claim 1, wherein the computing system comprises a processing cluster;
the method further comprising:
receiving, by the first hardware security module, the public transfer key from the second hardware security module and at least one other public transfer key from at least one other hardware security module included in the processing cluster, respectively;
wherein said encrypting the cryptographic security key also includes separately encrypting the cryptographic security key by the first hardware security module using the at least one other public transfer key for each of the at least one other hardware security module, respectively, and
wherein said providing the encrypted cryptographic security key to the second hardware security module also includes providing each of the separately encrypted cryptographic security key for each of the at least one other hardware security module to corresponding ones of the at least one other hardware security module.

4. The method of claim 3, wherein each of the public transfer key and the at least one other public transfer key are associated with a respective registered certificate, and
wherein said providing is based at least on respective validation conditions;
the method further comprising:
receiving each respective registered certificate; and
determining the respective validation conditions based at least on each respective registered certificate being valid or invalid.

5. The method of claim 3, wherein the cryptographic security key is the only security key for the first hardware security module utilized in the computing system for encrypting and decrypting the state data; or
wherein the method comprises executing the VM by the first processing circuitry prior to said determining.

6. The method of claim 1, further comprising:
generating the cryptographic security key by the first hardware security module prior to said encrypting the cryptographic security key;
wherein
the first hardware security module and the second hardware security module comprise respective trusted platform modules (TPMs); or
the method further comprises generating the cryptographic storage key, via a hypervisor of the computing system, based at least on the cryptographic security key.

7. The method of claim 1, wherein the transfer condition is associated with a migration of the VM to the second processing circuitry based at least on one or more of:
a balancing of processing resources,
a balancing of memory resources, or
a servicing associated with the first processing circuitry; or
wherein the transfer condition is based at least on a fail-over process associated with the first processing circuitry executing the VM.

8. A system, comprising first processing circuitry, a first hardware security module corresponding to the first processing circuitry, second processing circuitry, and a second hardware security module corresponding to the second processing circuitry;
the first processing circuitry configured to execute a virtual machine (VM) with a first virtual security module that is associated therewith and that is an instance of the first hardware security module, the first virtual security module having state data associated with the VM that includes a cryptographic storage key that encrypts data of a virtual disk of the VM, the state data describing a current execution of the first virtual security module and being encrypted with the cryptographic security key;
the first hardware security module storing a cryptographic security key;
the second hardware security module storing: a public transfer key and a private transfer key linked thereto;
the first hardware security module configured to:
encrypt the cryptographic security key using the public transfer key received from the second hardware security module, wherein a private transfer key corresponding to the public transfer key is stored by the second hardware security module; and
provide the encrypted cryptographic security key to the second hardware security module;
the second hardware security module configured to:
decrypt, using the private transfer key, the encrypted cryptographic security key; and
the second processing circuitry configured to:
execute the VM, subsequent to a transfer thereof from the first processing circuitry, with a second virtual security module that is an instance of the second hardware security module and based at least on the state data being decrypted for the second virtual security module using the cryptographic security key.

9. The system of claim 8, wherein the system comprises a processing cluster;
the second hardware security module being configured to:
provide the public transfer key to the first hardware security module prior to said encrypting the cryptographic security key and responsive to the second processing circuitry and the second hardware security module being added to the processing cluster; and
receive the encrypted cryptographic security key.

10. The system of claim 8, wherein the system comprises a processing cluster;
the first hardware security module being configured to:
receive the public transfer key from the second hardware security module and at least one other public transfer key from at least one other hardware security module included in the processing cluster, respectively;
separately encrypt the cryptographic security key using the at least one other public transfer key for each of the at least one other hardware security module, respectively; and
provide each of the separately encrypted cryptographic security key for each of the at least one other hardware security module to corresponding ones of the at least one other hardware security module.

11. The system of claim 10, wherein each of the public transfer key and the at least one other public transfer key are associated with a respective registered certificate, and
the first hardware security module being configured to:
provide the encrypted cryptographic security key and each of the separately encrypted cryptographic security key based at least on respective validation conditions that comprise determinations for each respective registered certificate being valid or invalid.

12. The system of claim 10, wherein the cryptographic security key is the only security key for the first hardware security module utilized in the system for encrypting and decrypting the state data.

13. The system of claim 8, wherein the first hardware security module is configured to:
generate the cryptographic security key prior to encryption thereof; and
wherein
the first hardware security module and the second hardware security module comprise respective trusted platform modules (TPMs); or
the cryptographic storage key is generated via hypervisor of the computing system based at least on the cryptographic security key.

14. The system of claim 8, wherein the transfer is:
associated with a migration of the VM to the second processing circuitry based at least on one or more of:
a balancing of processing resources,
a balancing of memory resources, or
a servicing associated with the first processing circuitry; or
based at least on a fail-over process associated with the first processing circuitry executing the VM.

15. Computer-readable storage device having program instructions recorded thereon that, when executed by a processing system that includes first processing circuitry, a first hardware security module corresponding to the first processing circuitry, second processing circuitry, and a second hardware security module corresponding to the second processing circuitry, perform a method, the method comprising:
encrypting, by the first hardware security module using a public transfer key received from the second hardware security module, a cryptographic security key stored by the first hardware security module, wherein a private transfer key corresponding to the public transfer key is stored by the second hardware security module;
providing the encrypted cryptographic security key to the second hardware security module;
determining that a transfer condition has been met for transferring a virtual machine (VM) to be executed by the second processing circuitry, wherein the VM is associated with a first virtual security module that is an instance of the first hardware security module, the first virtual security module having state data associated with the VM that includes a cryptographic storage key that encrypts data of a virtual disk of the VM, the state data describing a current execution of the first virtual security module and being encrypted with the cryptographic security key; and
decrypting, by the second hardware security module and using the private transfer key, the encrypted cryptographic security key;
decrypting the state data for the second virtual security module using the cryptographic security key and
executing the VM at the second processing circuitry using a second virtual security module that is an instance of the second hardware security module.

16. The computer-readable storage device of claim 15, wherein the processing system comprises a processing cluster; and
wherein the method further comprises:
prior to said encrypting the cryptographic security key and responsive to the second processing circuitry and the second hardware security module being added to the processing cluster, providing the public transfer key from the second hardware security module to the first hardware security module; and
receiving, by the second hardware security module, the encrypted cryptographic security key.

17. The computer-readable storage device of claim 15, wherein the processing system comprises a processing cluster; and
wherein the method further comprises:
receiving, by the first hardware security module, the public transfer key from the second hardware security module and at least one other public transfer key from at least one other hardware security module included in the processing cluster, respectively;
wherein said encrypting the cryptographic security key also includes separately encrypting the cryptographic security key by the first hardware security module using the at least one other public transfer key for each of the at least one other hardware security module, respectively, and
wherein said providing the encrypted cryptographic security key to the second hardware security module also includes providing each of the separately encrypted cryptographic security key for each of the at least one other hardware security module to corresponding ones of the at least one other hardware security module.

18. The computer-readable storage device of claim 17, wherein each of the public transfer key and the at least one other public transfer key are associated with a respective registered certificate;

wherein said providing is based at least on respective validation conditions; and wherein the method further comprises:

receiving each respective registered certificate; and determining the respective validation conditions based at least on each respective registered certificate being valid or invalid.

19. The computer-readable storage device of claim 17, wherein the cryptographic security key is the only security key for the first hardware security module utilized in the processing system for encrypting and decrypting the state data; or wherein the method comprises executing the VM by the first processing circuitry prior to said determining.

20. The computer-readable storage device of claim 15, wherein the method further comprises:

generating the cryptographic security key by the first hardware security module prior to said encrypting the cryptographic security key;

wherein the first hardware security module and the second hardware security module comprise respective trusted platform modules (TPMs); or the method further comprises generating the cryptographic storage key, via a hypervisor of the processing system, based at least on the cryptographic security key.

* * * * *